(12) United States Patent
Tang et al.

(10) Patent No.: US 10,531,510 B2
(45) Date of Patent: Jan. 7, 2020

(54) METHOD FOR SERVICE TRANSMISSION AND TRANSMISSION DEVICE

(71) Applicant: GUANGDONG OPPO MOBILE TELECOMMUNICATIONS CORP., LTD., Dongguan, Guangdong (CN)

(72) Inventors: Hai Tang, Dongguan (CN); Yuanqing Zeng, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/571,183

(22) PCT Filed: May 17, 2016

(86) PCT No.: PCT/CN2016/082381
§ 371 (c)(1),
(2) Date: Nov. 1, 2017

(87) PCT Pub. No.: WO2017/008572
PCT Pub. Date: Jan. 19, 2017

(65) Prior Publication Data
US 2019/0021127 A1 Jan. 17, 2019

(30) Foreign Application Priority Data
Jul. 14, 2015 (CN) .......................... 2015 1 0411259

(51) Int. Cl.
*H04W 76/10* (2018.01)
*H04W 76/11* (2018.01)
(Continued)

(52) U.S. Cl.
CPC .......... *H04W 76/19* (2018.02); *H04W 24/08* (2013.01); *H04W 28/0247* (2013.01);
(Continued)

(58) Field of Classification Search
CPC ... H04L 5/0091–0098; H04L 67/2847; H04W 16/02–16; H04W 24/02–10;
(Continued)

(56) References Cited

U.S. PATENT DOCUMENTS

| 7,844,760 B2 | 11/2010 | Jeyaseelan | |
| 2008/0225829 A1* | 9/2008 | Sachs | H04W 48/18 370/351 |

(Continued)

FOREIGN PATENT DOCUMENTS

| CN | 102378358 A | 3/2001 |
| CN | 101378360 A | 3/2009 |

(Continued)

OTHER PUBLICATIONS

Supplementary European Search Report in European application No. 16823719.6, dated Oct. 5, 2018.*

(Continued)

Primary Examiner — Timothy J Weidner

(57) ABSTRACT

An embodiment of the present disclosure provides a method for service transmission, including that: a transmission device determines that at least one first radio access technology in multiple radio access technologies is in an active state; and the transmission device performs service transmission by using the at least one first radio access technology. In such a manner, in the embodiment of the present disclosure, the transmission device determines that the at least one first radio access technology in the multiple radio access technologies is in the active state, and performs service transmission by using the radio access technology in the active state, so that the efficiency of the service transmission may be ensured.

14 Claims, 3 Drawing Sheets

```
┌─────────────────────────────────────────────┐
│ A transmission device determines that at    │   S101
│ least one first radio access technology in  │
│ multiple radio access technologies is in    │
│ an active state                             │
└─────────────────────────────────────────────┘
                        │
                        │
┌─────────────────────────────────────────────┐
│ The transmission device performs service    │   S102
│ transmission by using the at least one      │
│ first radio access technology               │
└─────────────────────────────────────────────┘
```

(51) Int. Cl.

| | |
|---|---|
| *H04W 76/16* | (2018.01) |
| *H04W 76/18* | (2018.01) |
| *H04W 76/19* | (2018.01) |
| *H04W 76/28* | (2018.01) |
| *H04W 88/06* | (2009.01) |
| *H04W 88/10* | (2009.01) |
| *H04W 48/18* | (2009.01) |
| *H04W 36/38* | (2009.01) |
| *H04W 36/36* | (2009.01) |
| *H04W 36/14* | (2009.01) |
| *H04W 36/02* | (2009.01) |
| *H04W 28/02* | (2009.01) |
| *H04W 24/08* | (2009.01) |
| *H04L 29/08* | (2006.01) |

(52) U.S. Cl.
CPC ......... *H04W 36/023* (2013.01); *H04W 36/14* (2013.01); *H04W 36/36* (2013.01); *H04W 36/38* (2013.01); *H04W 48/18* (2013.01); *H04W 76/10* (2018.02); *H04W 76/11* (2018.02); *H04W 76/16* (2018.02); *H04W 76/18* (2018.02); *H04W 76/28* (2018.02); *H04L 67/2847* (2013.01); *H04W 88/06* (2013.01); *H04W 88/10* (2013.01)

(58) Field of Classification Search
CPC ......... H04W 28/0247; H04W 28/0278; H04W 36/0005–385; H04W 48/02–20; H04W 72/1215–1257; H04W 76/10–38; H04W 88/06; H04W 88/10
See application file for complete search history.

(56) References Cited

U.S. PATENT DOCUMENTS

| | | | | |
|---|---|---|---|---|
| 2009/0180451 | A1* | 7/2009 | Alpert | ............... H04W 72/1215 370/338 |
| 2011/0080868 | A1* | 4/2011 | Krishnaswamy | ..... H04W 48/18 370/328 |
| 2013/0016696 | A1* | 1/2013 | Adjakple | .......... H04W 28/0252 370/331 |
| 2013/0045744 | A1 | 2/2013 | Dimpflmaier | |
| 2013/0102313 | A1 | 4/2013 | Tinnakornsrisuphap | |
| 2014/0254498 | A1* | 9/2014 | Mueck | .............. H04W 28/0252 370/331 |
| 2015/0043554 | A1* | 2/2015 | Meylan | ............. H04W 72/1215 370/338 |

FOREIGN PATENT DOCUMENTS

| | | |
|---|---|---|
| CN | 102014453 A | 4/2011 |
| CN | 102404221 A | 4/2012 |
| CN | 102833724 A | 12/2012 |
| CN | 103583065 A | 2/2014 |
| CN | 103748935 A | 4/2014 |
| CN | 104581854 A | 4/2015 |
| RU | 2483449 C2 | 5/2013 |
| WO | 2012/092869 A1 | 7/2012 |
| WO | WO-2012092869 A1 * | 7/2012 ............ H04W 76/10 |

OTHER PUBLICATIONS

International Search Report (ISR) and Written Opinion (WO) dated Aug. 23, 2016 for International Application No. PCT/CN2016/082381.
Espacenet English abstract of WO 2012/092869 A1.
Espacenet English abstract of CN 102014453 A.
Espacenet English abstract of CN 102404221 A.
English Translation of the Written Opinion of the International Search Authority in international application No. PCT/CN2016/082381, dated Aug. 23, 2016.
First Office Action of the Russian application No. 2018105121, dated Oct. 7, 2019.

* cited by examiner ered by those skilled in the art on the basis of the embodiments in the present disclosure without creative work fall within the scope of protection of the present disclosure.

METHOD FOR SERVICE TRANSMISSION AND TRANSMISSION DEVICE

RELATED APPLICATION

This application is an application under 35 U.S.C. 371 of International Application No. PCT/CN2016/082381 filed on May 17, 2016, the entire contents of which are incorporated herein by reference.

CROSS-REFERENCE TO RELATED APPLICATIONS

The present disclosure claims priority to Chinese Application No. 201510411259.X, filed on Jul. 14, 2015 and entitled "METHOD FOR SERVICE TRANSMISSION AND TRANSMISSION DEVICE," the contents of which are incorporated herein by reference in its entirety.

TECHNICAL FIELD

Embodiments of the present disclosure relate to communications, and more particularly to a method for service transmission and a transmission device.

BACKGROUND

A next-generation mobile communication system (commonly known as 5th-Generation (5G)) may further improve quality of service. Except a common requirement on increase of a data rate and the like, ensuring continuity of service and meeting quality requirements of different services in various environments become important requirements of evolution to a user-centric network. Requirements of service which may be provided by a next-generation mobile communication system are ever-changing, and it is difficult for a single wireless technology to meet all the requirements on the premise of reasonable cost. An organic combination of different wireless technologies becomes a more feasible choice.

Under a conventional technical condition, different radio access technologies do not cooperate with each other. A user may usually select different radio access networks only by manual configuration, for example, manually selecting a Wireless Fidelity (WIFI) network or turning on a WIFI switch. Therefore, there exist serious disadvantages in performance and convenience.

SUMMARY

Embodiments of the present disclosure provide a method for service transmission, which uses at least one radio access technology in an active state in multiple radio access technologies for the service transmission and can improve performance and convenience of the multiple radio access technologies.

A first aspect provides a method for service transmission, which may include that:

a transmission device determines that at least one first radio access technology in multiple radio access technologies is in an active state; and the transmission device performs the service transmission by using the at least one first radio access technology.

A second aspect provides a transmission device, which may include:

a determination unit, configured to determine that at least one first radio access technology in multiple radio access technologies is in an active state; and a transmission unit, configured to perform service transmission by using the at least one first radio access technology determined by the determination unit.

In the embodiments of the present disclosure, the multiple radio access technologies include the at least one first radio access technology in the active state and at least one second radio access technology in a standby state. The transmission device may perform service transmission by using at least one radio access technology in the active state. Moreover, the states of the radio access technologies may be switched according to a condition, thereby ensuring continuity of a service and further improving an efficiency of the service transmission.

BRIEF DESCRIPTION OF DRAWINGS

In order to describe the technical solutions of the embodiments of the present disclosure more clearly, drawings required to be used for descriptions about the embodiments or a conventional art will be simply introduced below. Obviously, the drawings in the following descriptions are only some embodiments of the present disclosure. Those skilled in the art may further obtain other drawings according to these drawings without creative work.

DETAILED DESCRIPTION

The technical solutions in the embodiments of the present disclosure will be clearly and completely described below in combination with the drawings in the embodiments of the present disclosure. Obviously, the described embodiments are not all embodiments but part of embodiments of the present disclosure. All other embodiments obtained by those skilled in the art on the basis of the embodiments in the present disclosure without creative work fall within the scope of protection of the present disclosure.

It is noted that a radio access technology in the embodiments of the present disclosure may also be called a wireless technology, including but not limited to, Long Term Evolution (LTE) commonly known as 4th-Generation (4G), a Wireless Local Area Network (WLAN), future 5G and the like.

It is noted that a terminal in the embodiments of the present disclosure may refer to a mobile terminal, including but not limited to, a cellular phone, a Personal Digital Assistant (PDA), a terminal device in a future 5G network and the like.

It is noted that a network device in the embodiments of the present disclosure may be a base station controller or base station server configured to manage and control multiple base stations in a centralized manner, and may also be a Mobility Management Entity (MME) and the like configured to communicate with the multiple base stations, which will not be limited in the present disclosure.

It is noted that both the terminal and the network device in the embodiments of the present disclosure support multiple radio access technologies. Moreover, the multiple radio access technologies may independently use or share the same software and hardware resource. Herein, the software and hardware resource may include an antenna, a radio frequency module, a baseband module, a processor, a storage system, a user interface and the like. When the same software and hardware resource is shared, the multiple radio access technologies may separately use or simultaneously use the same software and hardware resource.

Figure 1:
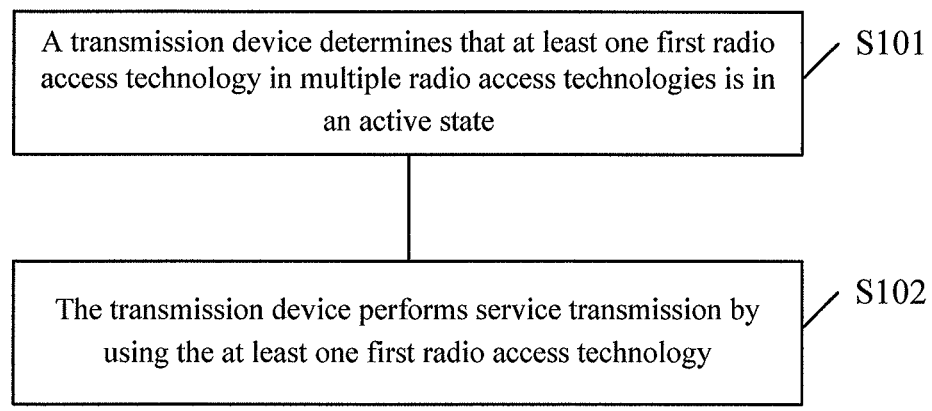
FIG. 1 is a flowchart of a method for service transmission according to an embodiment of the present disclosure.

FIG. 1 is a flowchart of a method for service transmission according to an embodiment of the present disclosure. The method shown in FIG. 1 includes the following steps.

In S101, a transmission device determines that at least one first radio access technology in multiple radio access technologies is in an active state.

In the embodiment of the present disclosure, the transmission device may be a terminal, or the transmission device may also be a network device.

As can be understood, before S101, the method may include that the transmission device selects the multiple radio access technologies. For example, when the transmission device has a service to be transmitted, the transmission device selects the multiple radio access technologies for the service. Moreover, the multiple radio access technologies all support the service.

The transmission device may determine that the at least one first radio access technology in the multiple radio access technologies is in the active state and determine that at least one second radio access technology in the multiple radio access technologies is in a standby state.

Specifically, the transmission device may select the at least one first radio access technology from the multiple radio access technologies, for example, first radio access technologies A1-A5, most suitable for service transmission, and set the at least one first radio access technology into the active state.

Herein, the active state refers to that the radio access technology has established a connection and may perform data transmission. Herein, the standby state refers to that the radio access technology has established a connection but cannot perform data transmission, or the standby state refers to that the radio access technology does not establish any connection but can establish a connection within a preset time length. That is, although not establishing any connection, the radio access technology in the standby state may establish the connection for data transmission at a very high speed, thereby avoiding influence on a service experience.

It can be understood that the at least one second radio access technology may have established a connection but there is no data transmission. Alternatively, the at least one second radio access technology may have yet not established any connection. Alternatively, part of second radio access technologies in the at least one second radio access technology may have established connections but there is no data transmission while the other second radio access technologies have yet not established any connection. There are no limits made in the present disclosure.

Herein, establishing connection may include having a connection Identifier (ID) and a connection context. For example, for transmission between a terminal and a network device, a network connection may have been established. For direct communication (which may also be called direct connection communication or Device to Device (D2D) communication) between terminals, a direct connection may have been established. Moreover, if a second radio access technology in the standby state has established a connection, the second radio access technology in the standby state may share a connection context of the first radio access technology in the active state.

For example, the shared connection context may be, for example, a data packet transmission and a queuing condition.

In S102, the transmission device performs the service transmission by using the at least one first radio access technology.

That is, the transmission device performs the service transmission by using the radio access technology in the active state. The at least one first radio access technology may adopt an aggregation mode and/or a diversity mode for the service transmission. In such a manner, the efficiency and success rate of the service transmission may be ensured, and transmission reliability may be improved.

It is noted that the states of the radio access technologies may be switched between the active state and the standby state in the embodiment of the present disclosure.

Optionally, as an example, in an execution process of S102, the transmission device may detect a network state of the at least one first radio access technology which is used.

For example, in the process of S102, if network states of one or more of the at least one second radio access technology are more suitable for service transmission (for example, the network states become better), the one or more of the at least one second radio access technology may be switched into the active state.

For example, in the process of S102, if network states of one or more of the at least one first radio access technology cannot ensure service transmission (for example, the network states get poor), one or more of the at least one second radio access technology may be switched into the active state.

For example, one or more of the at least one first radio access technology causes a service interruption due to coverage or a failure. Alternatively, signal quality of one or more of the at least one first radio access technology is lower than a preset quality threshold value. Alternatively, the at least one first radio access technology has a Radio Link Failure (RLF). Alternatively, the at least one first radio access technology has an RLF, and fails in radio link recovery. Alternatively, the transmission device predicts that the at least one first radio access technology is about to fail.

In such a manner, in the embodiment of the present disclosure, when part of radio access technologies in the active state cannot ensure service transmission, one or more in the standby state are switched into the active state and start data transmission, so that the continuity of a service may be ensured, and service transmission performance may further be improved.

Optionally, in the process of S102, the at least one second radio access technology may perform prefetch or cache on sent data of the service. For example, sent data of a preset data volume threshold value may be prefetched or cached. Alternatively, sent data of a preset time length may be prefetched or cached. That is, sent data of a certain time length or data volume may be prefetched or cached.

Here, the data volume threshold value or the time length may be determined by the transmission device according to a service characteristic of the service, a mobility characteristic of the terminal and a network condition. That is, the time length or data volume of the prefetched or cached sent data may be determined by such factors as the service characteristic, mobility of the terminal and the network condition or the like.

Herein, the service characteristic may include a data packet size, a sending frequency, a time delay, a time delay jitter requirement and the like. Herein, the mobility characteristic of the terminal may include a mobile speed of the terminal and the like. The network condition may include intensities and quality of transmitted signals, received by the terminal, of base stations of the multiple radio access technologies, maximum transmitted power and antenna gains of the multiple radio access technologies of the terminal and the like.

In such a manner, each second radio access technology in the standby state prefetches or caches the sent data. When the second radio access technology is switched into the active state for data transmission, the continuity of the service may further be ensured, and the transmission performance may be improved.

Optionally, as another example, in the execution process of S102, the transmission device may monitor the network state of the at least one second radio access technology in the standby state. When it is detected that the network states of one or more of the at least one second radio access technology cannot be in the standby state (for example, the transmission device is not located in coverage of one or more of the at least one second radio access technology any longer), at least one third radio access technology is selected to replace the one or more of the at least one second radio access technology.

For example, if a certain second radio access technology in the at least one second radio access technology is unsuitable to be kept in the standby state any longer for a certain reason, the certain second radio access technology may be deleted from a list of the at least one second radio access technology in the standby state.

For example, if the terminal is not located in coverage of a second radio access technology B1 any longer due to mobility of the terminal, the second radio access technology B1 may be regulated not to be in the standby state any longer. If the second radio access technology B1 has established a connection previously, the connection may be cut off at this moment.

Furthermore, the transmission device may reselect and set another suitable radio access technology to be in the standby state. For example, due to the mobility of the terminal, an intensity of a signal, which may be received by the terminal, of a third radio access technology is gradually enhanced, and when the intensity of the signal is higher than a preset intensity threshold value, the third radio access technology may be determined to be in the standby state.

Optionally, as another example, the transmission device may notify an opposite device of the transmission device of state changes of the multiple radio access technologies. In such a manner, information synchronization of the states of the radio access technologies between the transmission device and the opposite device may be maintained.

For example, if one or more of the at least one second radio access technology are switched into the active state, state changes of the one or more of the at least one second radio access technology may be notified of the opposite device of the transmission device.

For example, if one or more of the at least one first radio access technology cannot ensure service transmission, the one or more of the at least one first radio access technology are not in the active state any longer (which may be switched into the standby state, and may also be disconnected so as to be in neither the standby state nor the active state), and then state changes of the one or more of the at least one first radio access technology may be notified of the opposite device of the transmission device.

For example, if it is determined that an additional third radio access technology is in the standby state, that is, the radio access technologies in the standby state or a number thereof changes, a state change of the third radio access technology may be notified of the opposite device of the transmission device.

It can be understood that the opposite device refers to an opposite device which performs service transmission with the transmission device. That is, service transmission may be performed between the transmission device and the opposite device thereof.

Herein, in the embodiment of the present disclosure, the transmission device may be a terminal, and correspondingly, the opposite device is a network device or another terminal. Alternatively, the transmission device may be a network device, and correspondingly, the opposite device is a terminal.

Thus it can be seen that, in the embodiment of the present disclosure, the multiple radio access technologies include the at least one first radio access technology in the active state and the at least one second radio access technology in the standby state, and the transmission device may perform service transmission by using at least one radio access technology in the active state. Moreover, the states of the radio access technologies may be switched according to a condition, thereby ensuring the continuity of the service and further improving the service transmission efficiency.

Figure 2:
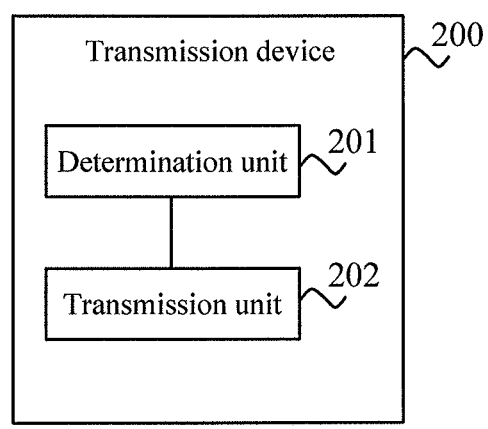
FIG. 2 is a structure block diagram of a transmission device according to an embodiment of the present disclosure.

FIG. 2 is a structure block diagram of a transmission device according to an embodiment of the present disclosure. The transmission device 200 shown in FIG. 2 may adopt multiple radio access technologies for communication, and includes a determination unit 201 and a transmission unit 202.

The determination unit 201 is configured to determine that at least one first radio access technology in the multiple radio access technologies is in an active state.

The transmission unit 202 is configured to perform service transmission by using the at least one first radio access technology determined by the determination unit.

In such a manner, in the embodiment of the present disclosure, the transmission device determines that the at least one first radio access technology in the multiple radio access technologies is in the active state, and performs service transmission by using the radio access technology in the active state, so that service transmission efficiency may be ensured.

Optionally, as an example, the transmission device 200 may further include a selection unit, configured to select the multiple radio access technologies for a service.

Optionally, in the embodiment of the present disclosure, the multiple radio access technologies may further include at least one second radio access technology, and the determination unit 201 may further be configured to determine that the at least one second radio access technology is in a standby state, wherein the standby state refers to that the second radio access technology has established a connection but there is no data transmission, or refers to that the second radio access technology does not establish any connection but may establish a connection within a preset time length. That is, although not establishing any connection, the second radio access technology may establish the connection at a very high speed.

Here, establishing connection may include having a connection ID and a connection context. Moreover, the at least one second radio access technology which is in the standby state and has established the connection may share a connection context (for example, a data packet transmission and a queuing condition) of the at least one first radio access technology.

Optionally, as an example, the determination unit 201 may further be configured to determine that the at least one second radio access technology in the standby state prefetches or caches sent data of the service. Specifically, sent data of a preset data volume threshold value may be prefetched or cached. Alternatively, sent data of a preset time length may be prefetched or cached, wherein the data volume threshold value or the time length is determined by the transmission device according to a service characteristic of the service, a mobility characteristic of the terminal and a network condition.

Optionally, as another example, the transmission unit 202 may further be configured to: in a service transmission process, monitor a network state of the at least one second radio access technology, and when detecting that network states of one or more of the at least one second radio access technology cannot be in the standby state, select at least one third radio access technology to replace the one or more of the at least one second radio access technology.

Optionally, as another example, the transmission unit 202 may further be configured to: in the service transmission process, monitor a network state of the at least one first radio access technology, and when detecting that network states of one or more of the at least one first radio access technology cannot ensure service transmission, switch the one or more of the at least one second radio access technology into the active state and perform service transmission by using the one or more of the at least one second radio access technology.

Herein, the condition that the network states of the one or more of the at least one first radio access technology cannot ensure service transmission may include that: the one or more of the at least one first radio access technology causes a service interruption due to coverage or a failure; or, signal quality of the one or more of the at least one first radio access technology is lower than a preset quality threshold value; or, the at least one first radio access technology has an RLF; or, the at least one first radio access technology has an RLF and fails in radio link recovery; or, the transmission device predicts that the at least one first radio access technology is about to fail.

It is noted that the condition that service transmission cannot be ensured may further include other conditions, which will not be listed herein.

Optionally, as another example, the transmission device 200 may further include a sending unit, configured to notify an opposite device of the transmission device of state changes of the one or more of the at least one second radio access technology, wherein the transmission device 200 may be a terminal, and the opposite device is a network device. Alternatively, the transmission device 200 is a network device, and the opposite device is a terminal. Alternatively, the transmission device 200 is a terminal, and the opposite device is another terminal.

Figure 3:
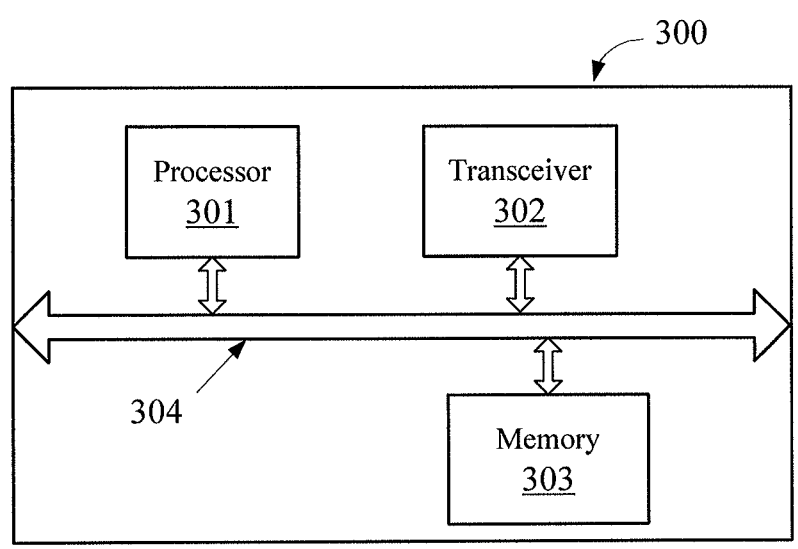
FIG. 3 is a structure block diagram of a transmission device according to another embodiment of the present disclosure.

It is noted that, in the embodiment of the present disclosure, the sending unit may be implemented by a transceiver, and the determination unit 201, the transmission unit 202 and the selection unit may be implemented by a processor. As shown in FIG. 3, a transmission device 300 may include a processor 301, a transceiver 302 and a memory 303, wherein the memory 303 may be configured to store codes executed by the processor 301 and the like.

Each component in the transmission device 300 is coupled together through a bus system 304, wherein the bus system 304 includes a data bus, and further includes a power bus, a control bus and a state signal bus.

The transmission device 200 shown in FIG. 2 or the transmission device 300 shown in FIG. 3 may implement each process implemented by the transmission device in the embodiment shown in FIG. 1, which will not be elaborated herein to avoid repetition.

Those skilled in the art may realize that the units and process steps of each example described in combination with the embodiments disclosed in the present disclosure may be implemented by electronic hardware or a combination of computer software and the electronic hardware. Whether these functions are executed in a hardware or software manner depends on specific applications and design constraints of the technical solutions. Those skilled in the art may implement the described functions for each specific application by different methods, but such implementation shall fall within the scope of the present disclosure.

Those skilled in the art may clearly understand that the specific working processes of the system, device and unit described above may refer to the corresponding processes in the method embodiment for convenient and brief description and will not be elaborated herein.

In some embodiments provided by the present disclosure, it should be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection of the devices or the units, implemented through some interfaces, and may be electrical and mechanical or other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being implemented in form of software function unit and sold or used as an independent product, the function may also be stored in a computer-readable storage medium. Based on such an understanding, the technical solutions of the present disclosure substantially or parts making contributions to a conventional art may be embodied in form of software product, and the computer software product is stored in a storage medium, including a plurality of instructions configured to enable a computer device (which may be a personal computer, a server, a network device or the like) to execute all or part of the steps of the method in each embodiment of the present disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the embodiments of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall conform to the scope of protection of the claims.

The invention claimed is:

1. A method for service transmission, comprising:
determining, by a transmission device, that at least one first radio access technology in multiple radio access technologies is in an active state; and
performing, by the transmission device, the service transmission by using the at least one first radio access technology;
wherein the multiple radio access technologies support a service to be transmitted by the transmission device;
the active state is a state in which the at least one first radio access technology has established a connection and performs a data transmission;
wherein the multiple radio access technologies further comprise at least one second radio access technology, and the method further comprises:
determining, by the transmission device, that the at least one second radio access technology is in a standby state, wherein the standby state refers to that the at least one second radio access technology has established a connection but there is no data transmission, or refers to that the at least one second radio access technology does not establish any connection but can establish a connection within a preset time length;
wherein the at least one second radio access technology prefetches or caches sent data of a service;
wherein prefetching or caching the sent data of the service comprises:
prefetching or caching sent data of a preset time length, wherein the time length is determined by the transmission device according to a service characteristic of the service, a mobility characteristic of a terminal and a network condition.

2. The method according to claim 1, wherein establishing the connection comprises: having a connection Identifier (ID) and a connection context.

3. The method according to claim 1, wherein the at least one second radio access technology shares a connection context of the at least one first radio access technology.

4. The method according to claim 1, further comprising:
in a process of the service transmission, monitoring a network state of the at least one second radio access technology; and
when it is detected that network states of one or more of the at least one second radio access technology cannot be in the standby state, selecting at least one third radio access technology to replace the one or more of the at least one second radio access technology.

5. The method according to claim 1, further comprising:
in a process of the service transmission, monitoring a network state of the at least one first radio access technology; and
when it is detected that network states of one or more of the at least one first radio access technology cannot ensure the service transmission, switching one or more of the at least one second radio access technology into the active state and performing service transmission by using the one or more of the at least one second radio access technology,
wherein the condition that the network states of the one or more of the at least one first radio access technology cannot ensure the service transmission comprises that:
the one or more of the at least one first radio access technology causes a service interruption due to coverage or a failure;
or,
signal quality of the one or more of the at least one first radio access technology is lower than a preset quality threshold value;
or,
the at least one first radio access technology has a Radio Link Failure (RLF);
or,
the at least one first radio access technology has an RLF, and fails in radio link recovery;
or,
the transmission device predicts that the at least one first radio access technology is about to fail.

6. The method according to claim 5, further comprising:
notifying an opposite device of the transmission device of state changes of the one or more of the at least one second radio access technology,
wherein the transmission device is a terminal, and the opposite device is a network device; or,
the transmission device is a network device, and the opposite device is a terminal; or,
the transmission device is a terminal, and the opposite device is another terminal.

7. The method according to claim 1, before determining that the at least one first radio access technology in the multiple radio access technologies is in the active state, further comprising:
selecting the multiple radio access technologies for a service.

8. A transmission device, comprising:
a processor; and
a memory configured to store instructions that, when executed by the processor, cause the processor to:
determine that at least one first radio access technology in multiple radio access technologies is in an active state; and
perform service transmission by using the determined at least one first radio access technology;
wherein the multiple radio access technologies support a service to be transmitted by the transmission device;
the active state is a state in which the at least one first radio access technology has established a connection and performs a data transmission;
wherein the multiple radio access technologies further comprise at least one second radio access technology, and the processor is further configured to:
determine that the at least one second radio access technology is in a standby state, wherein the standby state refers to that the at least one second radio access technology has established a connection but there is no data transmission, or refers to that the at least one second radio access technology does not establish any connection but can establish a connection within a preset time length;
wherein the processor is further configured to: determine that the at least one second radio access technology prefetches or caches sent data of a service;
wherein the processor is specifically configured to:
prefetch or cache sent data of a preset time length, wherein the time length is determined by the transmission device according to a service characteristic of the service, a mobility characteristic of a terminal and a network condition.

9. The transmission device according to claim 8, wherein establishing the connection comprises: having a connection Identifier (ID) and a connection context.

10. The transmission device according to claim 8, wherein the at least one second radio access technology shares a connection context of the at least one first radio access technology.

11. The transmission device according to claim 8, wherein the processor is further configured to:
   in a process of the service transmission, monitor a network state of the at least one second radio access technology; and
   when detecting that network states of one or more of the at least one second radio access technology cannot be in the standby state, select at least one third radio access technology to replace the one or more of the at least one second radio access technology.

12. The transmission device according to claim 8, wherein the processor is further configured to:
   in a process of the service transmission, monitor a network state of the at least one first radio access technology; and
   when detecting that network states of one or more of the at least one first radio access technology cannot ensure the service transmission, switch one or more of the at least one second radio access technology into the active state and perform service transmission by using the one or more of the at least one second radio access technology,
   wherein a condition that the network states of the one or more of the at least one first radio access technology cannot ensure the service transmission comprises that:
   the one or more of the at least one first radio access technology causes a service interruption due to coverage or a failure;
   or,
   signal quality of the one or more of the at least one first radio access technology is lower than a preset quality threshold value;
   or,
   the at least one first radio access technology has a Radio Link Failure (RLF);
   or,
   the at least one first radio access technology has an RLF, and fails in radio link recovery;
   or,
   the transmission device predicts that the at least one first radio access technology is about to fail.

13. The transmission device according to claim 12, further comprising a transceiver, configured to notify an opposite device of the transmission device of state changes of the one or more of the at least one second radio access technology,
   wherein the transmission device is a terminal, and the opposite device is a network device; or,
   the transmission device is a network device, and the opposite device is a terminal; or,
   the transmission device is a terminal, and the opposite device is another terminal.

14. The transmission device according to claim 8, wherein the processor is further configured to select the multiple radio access technologies for a service.

* * * * *